United States Patent
Missio et al.

[15] 3,690,767
[45] Sept. 12, 1972

[54] OPTICAL TANKER-DOCKING SYSTEM

[72] Inventors: Danilo V. Missio, Belmont; Herbert Wollman, Burlington; Irving G. Englander, Cambridge, all of Mass.

[73] Assignee: Systron-Donner Corporation

[22] Filed: Oct. 1, 1970

[21] Appl. No.: 77,214

[52] U.S. Cl. .......................... 356/5, 356/1, 356/141, 356/28, 343/9
[51] Int. Cl. .............................................. G01c 3/08
[58] Field of Search............356/4, 5, 141, 152, 1, 28; 343/9

[56] References Cited

UNITED STATES PATENTS

| | | | |
|---|---|---|---|
| 3,188,631 | 6/1965 | Birtley | 343/9 |
| 3,503,680 | 3/1970 | Schenkerman | 356/5 |

Primary Examiner—Benjamin A. Borchelt
Assistant Examiner—S. C. Buczinski
Attorney—Richard P. Crowley and Richard L. Stevens

[57] ABSTRACT

A docking system for large ocean-going vessels, which comprises a laser pulse range radar system having a laser transmitter and receiver, a retroreflector, and receiving and transmitting optics. Two such systems are disposed on a dock. The retroreflectors are disposed on the bow and stern of a vessel. The laser systems share a time interval meter, a computer, and a display panel. The lasers track the retroreflectors as the ship approaches the dock, and the time interval between the transmitted and received pulses is measured. Computations are made and the velocity of the approaching vessel, its distance from the dock, and the vessel position with reference to the dock are continually displayed. This information is then transmitted to the ship's captain.

9 Claims, 7 Drawing Figures

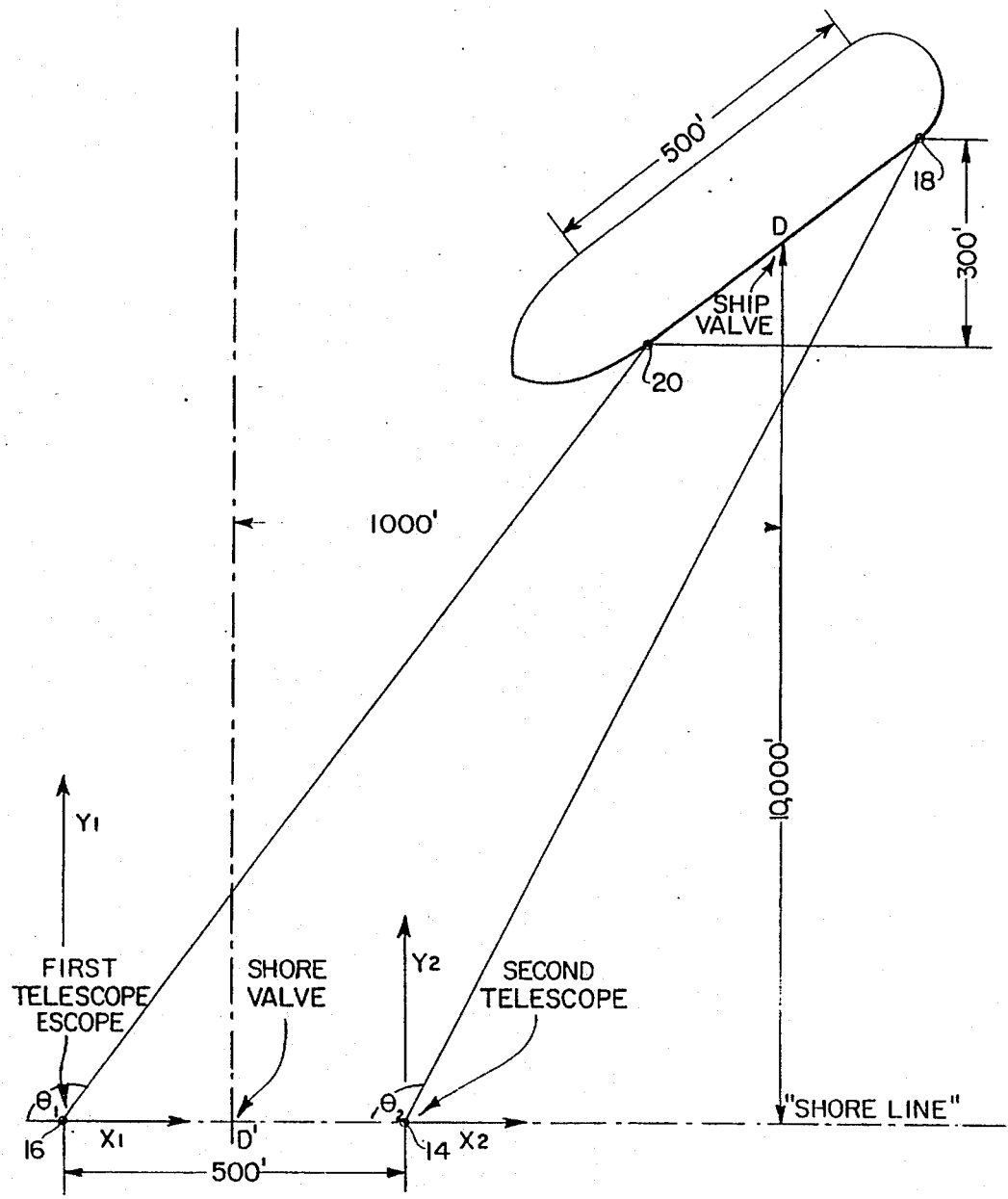
FIG. IC

OPTICAL TANKER-DOCKING SYSTEM

BACKGROUND OF THE INVENTION

In the docking of ships, particularly super tankers utilized for the carrying of oil, particular problems are encountered in that because of the size of the vessels particular care must be exercised when docking or anchoring said vessels to ensure that the momentum of the vessel is not misjudged whereby it may carry into some existing structure or another vessel causing damage. Tanker navigation devices based on the Doppler principle using either sonar or radar waves have been developed but are limited by the unreliability of the terrain under the dock and the theoretical limit of frequency detection and oscillator stability. The docking of huge oil tankers can be a complicated process also because of their large size. Tankers in the MANHATTAN class, for example, are about 100,000 tons and will eventually run from 200,000 to 400,000 tons in weight which is roughly the equivalent to 20 battleships of the MASSACHUSETTS class. The use of radar for docking these vessels have not been entirely successful since at close range the beam from the radar will spill over the reflector unless a large size reflector is utilized. This requirement leads to the development of large and unwieldy equipment and apparatus and further metallic objects such as on or about the dock where the vessel is to be berthed interfere with the accuracy of the radar.

Commonly used systems employed today use sonar to determine the velocity of the vessel moving through the water. However, in the sonar systems commercially used to date, the rate of speed of velocity of the vessel is based on the relative speed between the vessel and the ocean floor. This provides information to the captain as to the rate of speed of the vessel approaching a dock or anchoring facility. However, the distance between the dock and or anchoring facility is not provided in presently used devices; and accordingly, although the velocity of the vessel may be known relative to the ocean floor, judgment must still be employed in determining the velocity, acceleration and position relative to the dock which the vessel is approaching.

SUMMARY OF THE INVENTION

Our invention relates to a laser ranging system which sends out short bursts of energy to a reflector which may be mounted either on the dock or on the ship as the vessel gets ready for approach to its berth. The signals are reflected from the reflector in an extremely short time period and are processed by digital equipment to provide information about the distance remaining to travel, its closing velocity, acceleration, and the ship's attitude or position relative to the dock. The information displayed in digital or numerical form is used by the ship's captain and crew to make any changes or corrections necessary to bring about a gentle docking. In essence, the digital processing portion of the system averages out range measurements from a number of these pulses to give a more accurate calculation of the actual distance the ship has to travel. The laser's extremely narrow and short pulses are much more accurate than current methods employed today for slow speed vessels.

Briefly, our invention provides a docking system which using measured optical pulses determines the position, velocity and attitude of a ship with respect to a fixed shore installation with sufficient accuracy to enable the safe and rapid docking of very large ships. Two optical assemblies are adapted to transmit and receive pulses from retroreflectors. The time delay between the firing of the laser and the received pulse is proportional to the range of the ship. A portion of the received light is diverted to a specially positioned detecting photocell which produces signals which drive means to maintain the optical system pointing accurately at the retroreflective target. An angular encoder measures the angle of the telescope whereby combining the measured range and angle, a computer may determine the exact position of the retroreflector and thereby the exact position of the bow or stern of the vessel.

The computer is generally a digital circuit which causes the system to operate as a special purpose hybrid range computer. Normally, all logic for the system as designed is done in the computer whereas all arithmetic is done in the counter.

In the operation of the invention a timer or clock is counted down to produce a fixed number of pulses per second. Each pulse fires the laser and the transmitter which causes the time interval control to measure the time interval between the laser's current pulse and the interval control to measure the time interval between the laser current pulse and the received optical pulse. Because the light travels to a retroreflective target on the ship and back, the optical delay is proportional to range. In a preferred embodiment each measured pulse is tested for validity by comparing it to the average range determined in the previous second. All valid measurements are used to compute a 1-second average range which is stored in a memory register. Each second or fixed time interval, the most recent 1-second average range, is subtracted from the one obtained ten seconds previously to produce a number proportional to the range rate. This 1 second speed is stored in a memory register. The average of the 10 values of speed stored in the register and computed each second and displayed along side the current range. The 10 second averaging time is chosen to minimize any effects of the ship's roll which has a period of about 10 seconds.

Basically, the computer is responsible for overall timing of the system. The time interval unit or computing counter is in communication with the computer whereby the computer may be used to program the time interval unit. The time interval unit also communicates with the transmitter and receiving units in the optical telescope. Control of the entire system is handled by a small computer which performs at least some of the following functions: (a) programs and actuates the time interval unit; (b) if more than one optical telescope is employed, it separates and stores the data from each; (c) computes the range, velocity, acceleration; (d) to facilitate telescope tracking, the computer is used as a processor for a servocontrol system which function is performed in between computation time; and (e) provides output data and correct format for display purposes.

Accordingly, our invention eliminates the difficulty of the prior art devices and provides for a complete, safe system for docking vessels.

DESCRIPTION OF THE PREFERRED EMBODIMENT

Figure 1A:
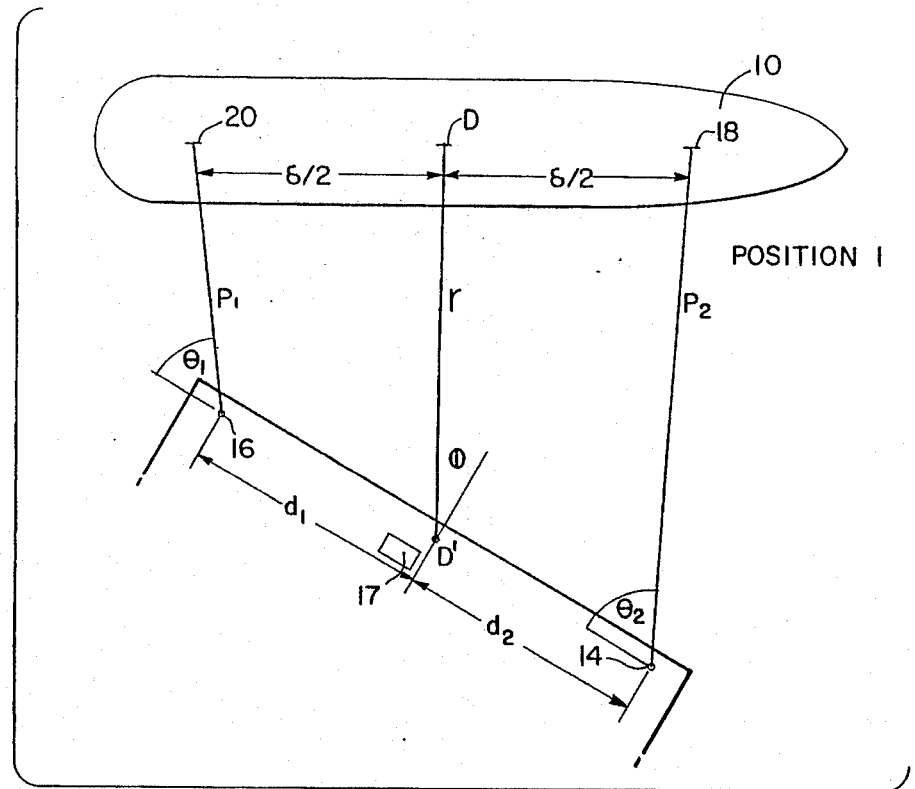
FIGS. 1a, b, and c are geometric representations of the complete system.
Figure 1B:
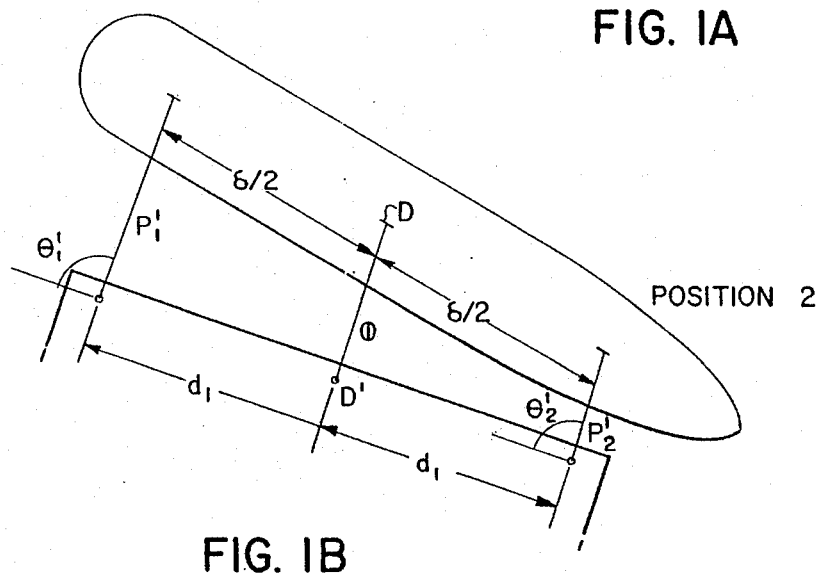

Referring to FIG. 1, two laser systems or optical telescopes which contain optical radar 14 and 16 are disposed on a dock 12. The telescope assemblies 14 and 16 are separated by distance D1 plus D2. The lasers disposed in the telescope assemblies are focused on retroreflectors 18 and 20, respectively, disposed on the bow and stern of a vessel being docked 10. The retroreflectors are separated by the distance δ. In the docking of the ship with our system, the range R is generally the distance between the outlet port for the oil carried in the ship or conversely the receiving port when the ship is empty and the fueling pump or discharge valves on the dock. The angle to the dock is measured as $\theta_1$ and $\theta_2$. This information may be used to determine the relative position of the vessel to the dock and is more clearly seen in a comparison of FIGS. 1a and 1b. The closing velocity $dr/dt$ determined from returned data P1 and P2.

Figure 2:
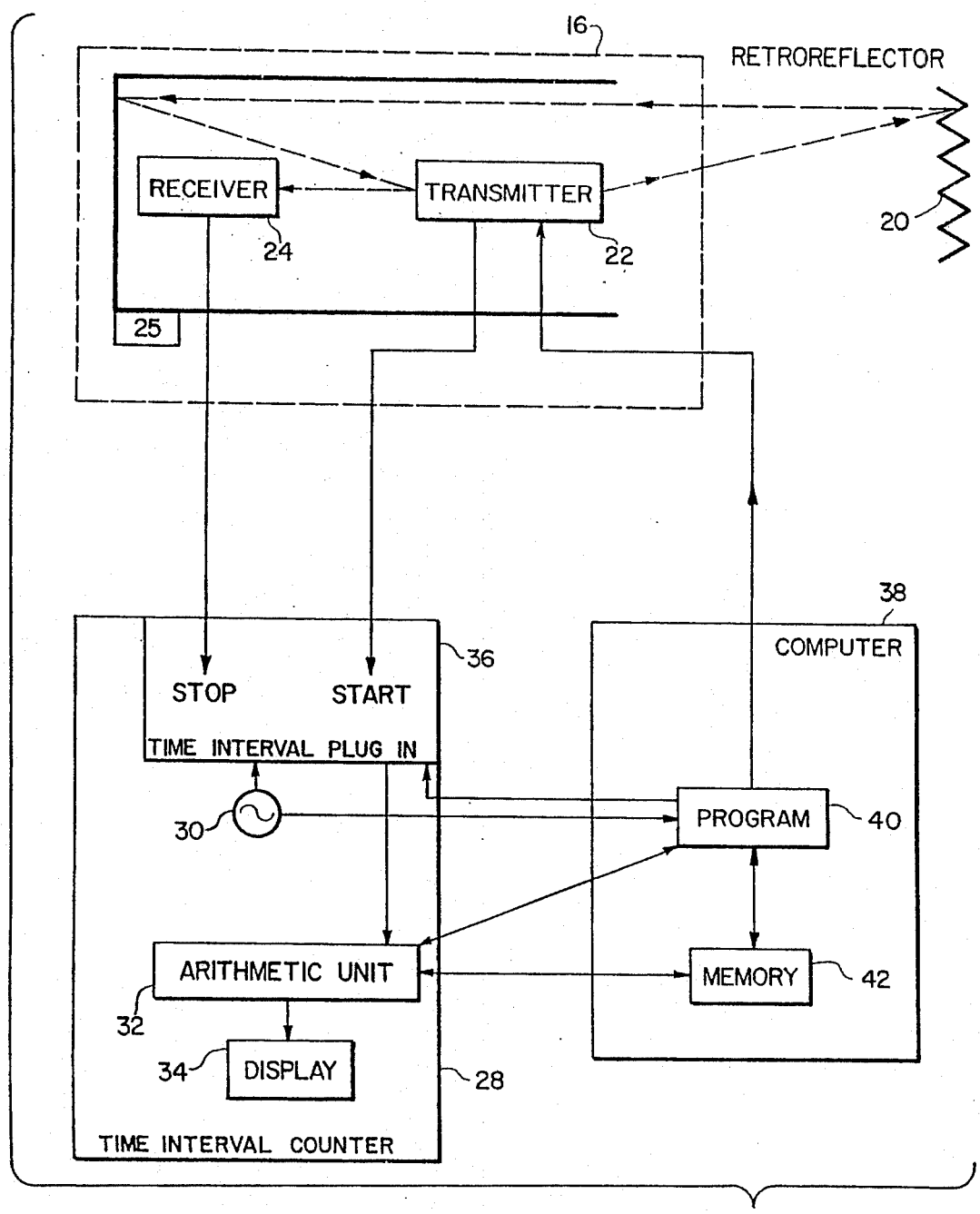
FIG. 2 is a block diagram form of the major components of the system.

Referring to FIG. 2, the optical telescope assembly 16 is connected to the time interval counter 28 and computer assembly 38 via appropriate interconnecting cables. That is, the optical assemblies 14 and 16 shown in FIG. 1a, are connected to a common time interval counter 28 and computer 38 which counter and computer service both telescope assemblies.

Figure 4:
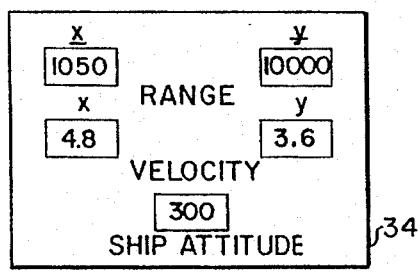
FIG. 4 is a front elevational of the control panel.

In the following discussion and referring to FIG. 4, the information from the optical telescopes fed to the computer is displayed as the $x$ and $y$ coordinates of range with reference to D and D′, the vessel's berthing position where the intake and output ports of the dock may be engaged, shown at either end of line r in FIG. 1. Similarly, the $x$ and $y$ components of closing velocity of D to D′ and passing velocity of D to D′ are displayed. The ship's attitude is given as the difference between the $y$ coordinates with reference to D and D′. However, if desired, the ship's attitude position may be given with respect to the bow and stern positions of the vessel with respect to the dock.

Each telescope assembly consists of a large catadioptric telescope for the receiver 24 and a smaller coaxially mounted transmitter 22. Inside each transmitter is a solid-state injection laser (not shown) which emits a series of short pulses of infrared energy when triggered by the computer 38. The emitted light is collimated and directed at the retroreflector 20 which is placed on the ship. A small portion of the transmitted energy is reflected back into the receiving telescope 24 which focuses it onto a photocell (not shown). The photocell output is an electrical pulse which is amplified and transmitted to the time interval counter 28. Some of the received light is directed to a specifically positioned detecting photocell which produces electrical signals which signals drive servos 25 to maintain the transmitter pointing accurately at the retroreflective target. An angular encoder measures the angle so that by combining the measured range and angle the computer can determine the exact position of the retroreflector.

The time interval counter produces a digital number which represents the time delay between the firing of the laser and the received pulse. As shown, the time interval counter comprises an oscillator 30, an arithmetic unit 32, a display 34, and a time interval plug-in 36. The time interval unit is interfaced with the computer 38 which comprises the program portion 40 and the memory 42. The time interval unit 28 is also directly coupled to the telescope assemblies 16 and 14, although for the purposes of description only the telescope assembly 16 in combination with the retroreflector 20 have been shown. The time interval plug-in 36, the time interval counter 28 and the computer 38 are standard equipment specifically programmed for our docking system. The time interval counter 28 is a versatile instrument which combines the functions of a general purpose electronic counter and a desk calculator. It contains power supplies, a stable oscillator, a nixie type display, an arithmetic unit which performs floating point arithmetic on digital numbers, and special purpose counters and time interval digitalizers. The counter is used with a time interval plug-in. This plug-in contains two trigger circuits, as well as the circuitry to execute a sub-program which produces a number equal to the time difference between the trigger trip points. For example, a time interval counter which may be used is a Hewlett Packard computing counter Model 5360A in combination with the Hewlett Packard interval plug-in Model 5379A which unit allows a time interval to be measured to a resolution of $10^{-10}$ seconds.

Figure 3:
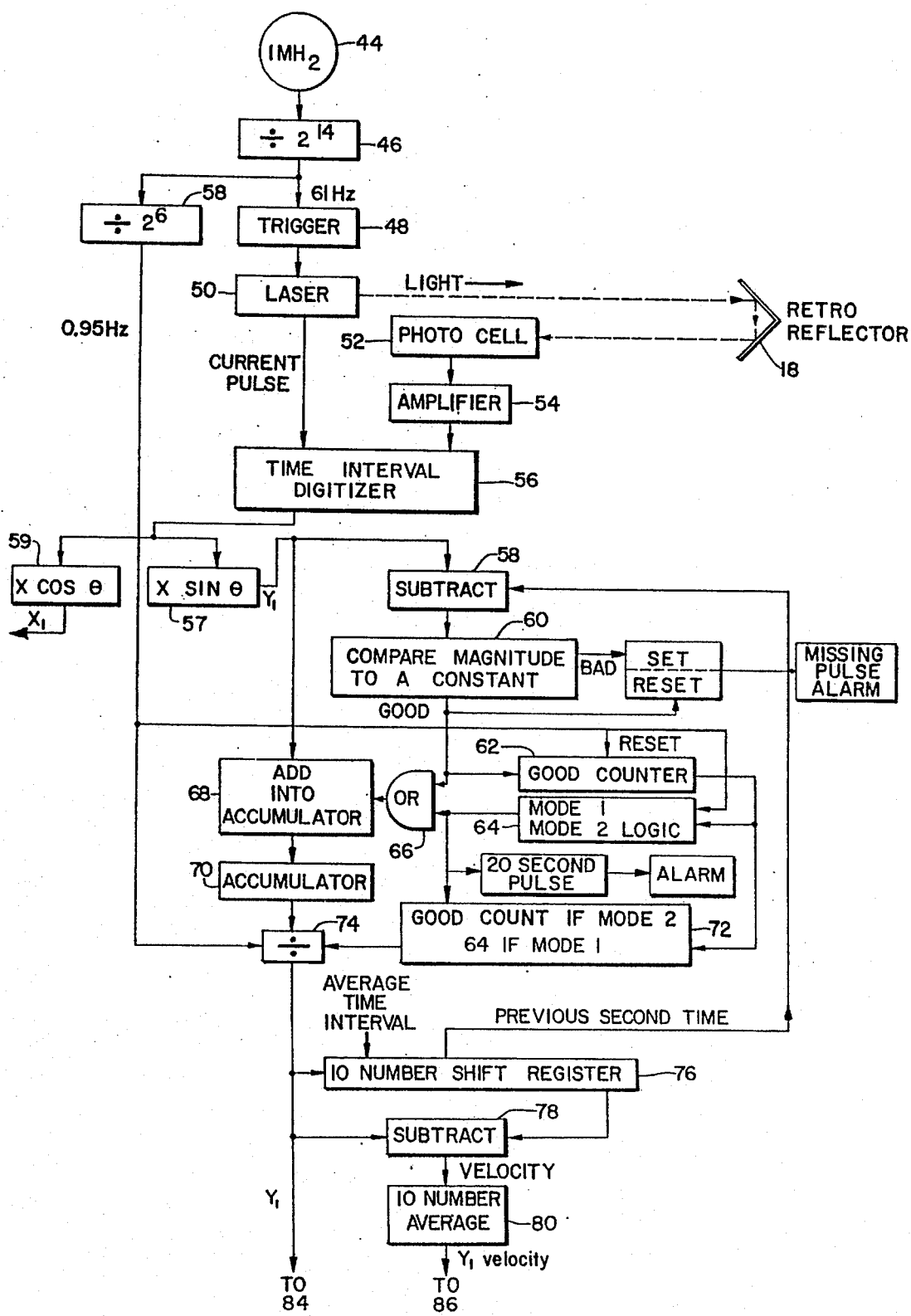
FIG. 3 is a block diagram representation of the information and control program employed in the docking process.

The computer is a complex digital circuit which causes the system to operate as a special purpose hybrid range computer. It consists of information storage registers, a fixed program matrix, and the necessary logic circuits to step the counter through the program. All arithmetic is done in the counter, and all logic in the control unit. The computer employed in our invention is a mini-computer with 4K of memory, such as a Digital Equipment Corporation PDP-8 or a Varian 620I. The computer 38 is used to program the time interval counter 28. The velocity is computed as a change in range and acceleration when required as changed velocity. These functions are performed within the computer 38 itself. The computing facility in the time interval counter is sufficient to provide some of the digital filtering required to compensate for temporary loss of signal due to instructions and to eliminate the effects of random noise and the rolling motion of the ship. The computer 38 enables the time interval unit, determines which telescope is operating and separates the data from each. The data is separately stored and processed. The computer handles the computation of ranges, velocities, and accelerations, and is also utilized as a processor for the servocontrol system 25 associated with the telescope assembly. The process program is shown in FIG. 3 and will be described in reference to FIG. 1c.

Referring to FIG. 1c, the retroreflectors 18 and 20 disposed on the bow and stern of the ship are separated by a distance δ of about 500 feet. The optical telescope assemblies 14 and 16 disposed on the dock are separated by a distance of about 500 feet from one another. The infrared lasers at 14 and 16 initially require manual acquisition of the two retroreflectors 18 and 20. However, once the lasers have been positioned, they will automatically track the same retroreflectors through the servo mechanisms 25 shown in FIG. 2 which incorporates standard angular encoders therein compatible with the range and velocity accuracies required. As described, the lasers are able to range against a retroreflector of about 1 square foot area disposed on the bow and stern of the ship up to a distance of about 2 miles with a velocity accuracy of about 1 foot per minute. In referring to FIG. 1c, the lasers are initially directed at the retroreflectors manually and the system then actuated.

Upon actuation, the clock or oscillator 44 is counted down or divided at 46 to produce 61 pulses per second. The pulses are directed to the trigger 48 which causes a switch to actuate an energy storage device, such as a capacitor, which discharges its energy to the laser 50. The laser fires in the infrared range and at the same time a signal is transmitted to the time interval digitizer 56. The pulse is transmitted to the retroreflector 18 and reflected back to the receiver 24 striking the photocell 52, the signal is amplified at 54, and transmitted to the time interval digitizer 56 disposed in the time interval counter 28. If the bow of the ship, more specifically the retroreflector on the ship, is spaced apart from the laser 14 on the dock 12 at a distance of about 10,000 feet, the time difference between the transmitted and received pulse will be about 2 microseconds. The range gate 60 identified in block form as "compare magnitude to a constant" is designed to ignore any data received if it does not fall within a certain range. For example, if the change in time delay is greater than 100 nanoseconds, the time interval measurement is stopped and the data is ignored. This is indicated by the arrow showing bad.

At the same time the digitized representation of the time interval is transferred to the add into accumulator 68 from the time interval digitizer 56. There are two modes of operation interconnected with the range gate 60, Mode 1 where all other data is considered valid and processed, and Mode 2 where data is rejected by the range gate if it differs from the previous range by more than 50 feet or 100 nanoseconds. Such a change would require a velocity change exceeding the maximum possible for the movement of the ship under all circumstances. Accordingly, in the first second of operation the Mode 1 is in effect, the information added into the accumulator 68, and transmitted to the accumulator or register 70 which is zeroed in every 1.05 seconds.

The system is designed to always start in Mode 1, which is consequently called the "start" mode. In this mode, all measurements of the time interval digitizer 56 are accepted, whether or not they agree with the number which is stored in the comparitor 60 which normally holds the average measured during the previous second. As the stored number might have been left from a previous docking, or might be zero if it had been cleared by a power interruption, normally the new measurements would not agree with the stored value, and the comparitor 60 would indicate bad data. However, in Mode 1, all measurements are added into the accumulator 70. After about 1.05 seconds, 64 measurements have been added, and the counter causes the number in the accumulator 70 to be divided by 64, producing a new number which is the average of the 64 measurements made. If the system is aligned so that an adequate optical signal is received, this average will be an accurate indication of its true value.

During the next 1.05 second period, 64 more measurements are made. If the retroreflector remains in the laser beam, the returned optical signal will be strong, so that all of the time interval measurements will be accurate, and hence near enough to the stored value of the last second average to be indicated as "good" by the comparitor 60. The "good counter" 62 will reach 64 because 64 good pulses are counted and this causes the logic to switch to Mode 2. The logic will switch back to Mode 1 whenever (1) the system is first started, (2) a manual reset button, which clears the memory registers is pushed, or (3) less than a certain number, such as 56, of the 64 measurements made in an interval are "good". If 57 to 64 measurements are made within 1.05 seconds and such measurements are good, the Mode remains unchanged. For example, if operating in Mode 2 and 59 good measurements are made, when the accumulator zeroes in after 1.05 seconds, the accumulated values are divided by 59 or 74. If only 52 good pulses are counted and the system is in Mode 2, at the end of 1.05 seconds the pulses stored in 70 are divided by 52 and the system shifts to Mode 1.

When no pulses are received a signal is directed to a flip-flop circuit 61 which is actuated to a set position. This actuates a missing pulse light which will remain lit for as long as no pulses are received. A 20-second pulse circuit 67 communicates with the Mode 1 and Mode 2 logic and is adapted to be actuated when the system is operating in Mode 1. When the system goes to Mode 2, the alarm will remain on for approximately 20 seconds, since it takes approximately 20 seconds for the bad data to leave the system. Accordingly, the two alarm systems serve as an indication to check the operation of the system if it appears that bad data is being received for a prolonged period of time or if no pulses are received. In other words, the first described alarm system is for when there is a missing pulse or pulses are not being received at all regardless of the value of the data, and the second alarm system is relative to correcting errors when the data being received is not within the predetermined values.

As a specific example, consider the case shown in FIG. 1c, with the discharge valve D on the vessel initially 10,000 feet out from the effective shore line D', defined as the extension of the line joining the two telescopes. Also, assume that the two telescopes 14 and 16 are each 250 feet from the shore valve, and that the retroreflectors 18 and 20 are also 250 feet from the ship valve. If the vessel is headed so that the forward retroreflector 18 is 300 feet nearer the "shore line" than the rear, the distances between the telescopes and retroreflectors can be found by simple trigonometry.

Referring to FIG. 3, the following computations and calculations will be with reference to FIG. 1c and FIG. 3 wherein the logic and components shown therein are applicable to the calculation of the $y$ components from one telescope, it being of course understood that similar substantially identical components and logic would be used for the calculation of the $x$ components from the same optical assembly, the $x$ and $y$ components from the second optical assembly.

The first telescope will be at a distance of 9,905.806 feet to the reflector, with $\theta_1$ equal to 96° 05.10'. The light travels at a speed of 9.832985 × 10⁸ feet per second, so that the light pulse will take 20.00973 microseconds for the round trip. The systematic errors in the amplifiers and time interval digitizer are less than ± 2.0 nanoseconds, and in addition there is a random error caused by noise of less than ± 0.5 nanoseconds. Consequently the time interval digitizer will produce a measurement of 20.0123 to 20.0072 microseconds. The angular encoder 25 on the first telescope 14 would measure an angle, $\theta_1$, of 96° 05.10'. Typically, the encoder would generate a digital number proportional to the angle, with an absolute accuracy of better than ±0.2 arc minute. The computer 38 would calculate the sine and cosine of the measured value of $\theta_1$, and multiply them by the measured time interval at 57, 59 to obtain the cartesian $x$ and $y$ components of the distance from the telescope 16 to the retroreflector 20. For this specific case, the $x$ component would be 2.1357 ± 0.14 microseconds, corresponding to a distance of 1,050 ± 6.5 feet, with a resolution of ± 0.7 feet. In the $y$ component, the time delay would be 20.0345 ±0.003 microseconds, corresponding to 9,850 ± 1.6 feet, with a resolution of ± 0.3 feet. This measured value of the $y_1$ component is compared to the stored value obtained in the previous second in the comparitor 60. If the system had been in operation, there would be agreement to within the ± 50 foot limit or 100 nanoseconds, the new reading would be considered "good" and would be added into the accumulator 70 and increment the good counter 62. If the system had just been started, or had just acquired the retroreflector into the laser beam, there would not be agreement, but it would be in Mode 1, and hence the measured values would be accumulated.

Figure 5:
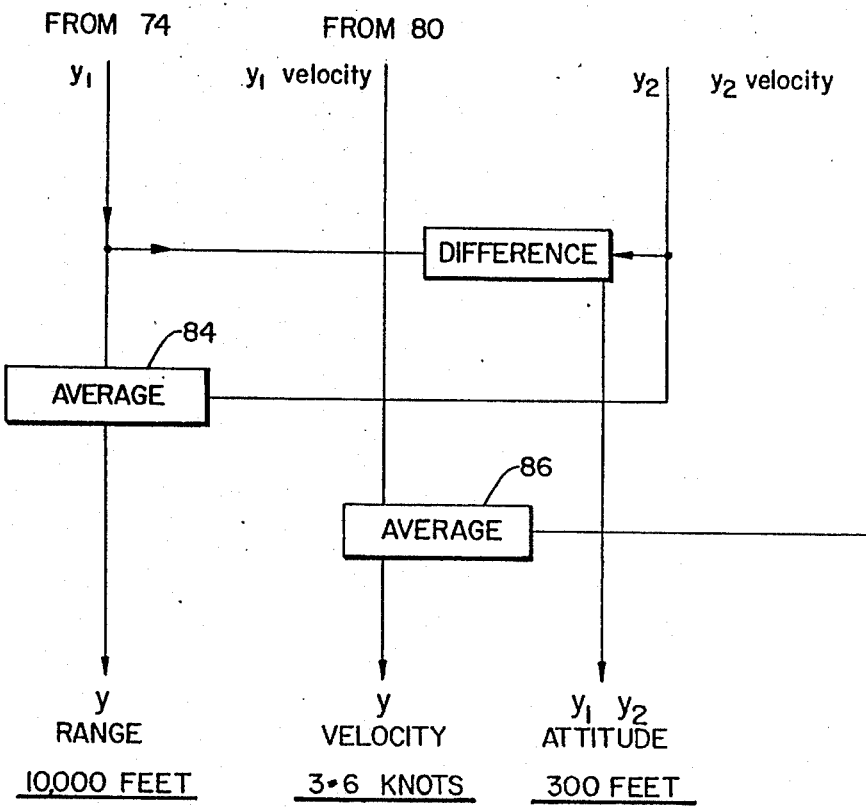
FIG. 5 is a block diagram of the program required for computing the velocity components.

The $y_1$ value leaves the divider 74 and goes to the 10-number shift register 76 and directly to the average 84 as shown in FIG. 5. The $y_2$ average from the second optical system is arrived at in a similar manner and also goes to average 84 where the $y_1$ and $y_2$ numbers are averaged. This averaged number is then displayed on the display panel 82 as the $y$ coordinate of the range every 1.05 seconds. At the same time, the value from the divider 74 is stored in the 10-number shift register 76.

After the computation resulting from the measurement made with the first telescope is completed, the second telescope fires its laser, and makes a measurement. The measured time delay of 20.77678 microseconds and measured angle of 96° 27.84' are used to compute an $x$ position component of 950 feet, and a $y$ component of 10,150 feet, with the same accuracy and resolution as the first telescope.

If the ship is moving forward with a velocity of 6 knots or 10.13 feet per seconds, it will move about 0.16 feet in the time between successive laser pulses, which is too small a distance to clearly resolve. During a computation interval of $2^{20}$ microseconds, or about 1.05 seconds, each telescope will make 64 measurements. Since errors caused by random noise will tend to cancel, the resolution of the average will be improved by a factor of about the square root of 64, or 8. The computed average position of the first retroreflector will therefore be 1,046 ± 6.5 feet with a resolution of 0.1 feet in $x$, and in $y$ it is 9,847 ± 1.6 feet, with a resolution of 0.04 feet. For the second telescope, the range is 946 ± 6.5 feet with a resolution of 0.01 feet in $x$, and in $y$ it is 10,147 ± 1.6 feet with a resolution of 0.04 feet. During this second 1.05 second interval, all of the measurements will agree with the average obtained during the first interval, which will set the system into Mode 2.

Ten computation intervals of $2^{20}$ microseconds each will take 10.486 seconds, during which time the ship will move 106.26 feet, 85.01 feet in the $x$ component, and 63.76 in the $y$ component. The eleventh computed average position with respect to the first telescope will be 960.99 ± 6.5 feet in $x$ and 9783.24 ± 1.6 feet in $y$. The computer will subtract the first position from the 11th at 76 and 78 and compute a change of 85.01 ± 13 feet in $x$, and 63.76 ± 3.2 feet in $y$. This is equivalent to a velocity of 4.8 ± 0.73 knot in $x$, and 3.6 ± 0.18 in $y$.

Referring to FIG. 3, the computation of the velocity is shown as leaving the 10-number average 80 where a number representative of the change in position relative to knots is averaged with a similar 10-number averaged $y_2$ component at 86. This value is then displayed as the $y$ coordinate of velocity on the display 82 at the end of each 1.05 second computation interval.

At the end of each 1.05 second computation interval, the $x$ components of the two telescope-to-retroreflector distances are averaged to yield the figure for the $x$ component of the distance from the shore valve to the ship valve D—D', and this is displayed. For the first interval described above, this is the average of 1,050 ± 6.5 feet and 950 ± 6.5 feet, or 1,000 ± 6.5 feet, or equivalently 333.3 ± 2.2 yards. The average of the $y$ components is also displayed, in this case it is 10,000 ± 1.6 feet. The difference in the $y$ components of the two telescopes is the "tilt," it is computed to be 300 ± 3.2 feet, and also displayed. The value of the range of the $y_1$ component from the divider 74 is compared with the corresponding $y_2$ range component at 88 and this value is shown on the display as attitude. If desired, a sixth reading may be displayed which is the tilt velocity by determining the difference between the $y_1$ velocity component and $y_2$ velocity component. In each computation interval, the change in the position and tilt during the previous 10 intervals is computed. These values are averaged for 10 intervals, and converted to knots for display as velocity. Due to the nature of the systematic errors in the measurement of range and bearing angle, it is possible for the initial velocity computation head on the change in two position measurements to have a moderate error. However, as this error is bounded and cyclic, the final averaging greatly reduces the possible error in the final displayed velocity.

As described, the display is on the dock. The information may be transmitted to the ship's captain via any appropriate means such as UHF channels.

The invention has been described with reference to 64 measurements per 1.05 seconds period. It is to be understood that the specific values relating to the number of measurements per time period, the averaging of values for velocity with the 10-number shift register, and the value set forth in the comparitor have been used for illustrative purposes only.

Although the system has been described in reference to the docking of a vessel (moving object) to the dock (fixed object), it is obvious that it may be employed for landing of airplanes, air-to-air refueling of space craft, ship-to-ship docking for transfer of supplies; that is, for controlling the relative position between a fixed and movable object or between two movable objects. Also, the retroreflectors could be disposed on the dock and the optical system on the ship if desired.

Having described our invention, what we now claim is:

1. A docking system for vessels wherein the distance between the vessel and dock varies with time, which system comprises:
   a first optical assembly which includes means to transmit a plurality of pulses to the target whereby the pulses are reflected back to the optical assembly, the assembly including means to receive the reflected pulse;
   a second optical assembly which includes means to transmit a plurality of pulses to a second target said second optical assembly spaced apart from the first optical assembly and said second target spaced apart from said first target whereby the pulses may be reflected back to the second optical assembly, and which assembly includes means to receive the reflected pulses;
   a time interval unit which includes means to measure the time delay between the transmitted and received pulses of the first and second optical assemblies, means to produce digitized numbers which represent said time delays, means to average the numbers received from the first and second optical assemblies to provide an average number which average number is representative of the ship's berthing position in reference to the dock at some point intermediate of the positions of the first and second optical assemblies and first and second targets, means to display the averaged numbers to indicate the ship's relative position to its berth; and
   a computer interfaced with the time interval unit to program the time interval unit, to store data received from the time interval unit, to control the computation of the data in the time interval unit relating the ship's position relative to the dock, and to control the separation of data from the first and second optical assemblies.

2. The system of claim 1 wherein the first and second optical assemblies include means to determine an angle between the first optical assembly and the first target and means to determine an angle between the second optical assembly and the second target, and means to determine the range of the ship with reference to the dock and its berthing position along $x$ and $y$ coordinates and means to display the relative position of the ship to the dock along the $x$ and $y$ coordinates.

3. The system of claim 1 which includes means to utilize the averaged numbers to compute the velocity of the ship with reference to the dock and its berthing position along $x$ and $y$ coordinates.

4. The system of claim 1 wherein the optical assemblies are spaced apart on the dock and the reflectors are disposed on the bow and stern of the vessel, and further wherein the time interval delay means, the display means, and the computer are common to both the first and second optical assemblies.

5. The system of claim 1 wherein the time interval delay means includes means to average the digitized numbers received from both first and second optical assemblies to provide an average number whereby said average number is used for computation purposes for range and velocity.

6. A method for docking a vessel which comprises:
   transmitting a first pulsed beam from a first position to a first reflector;
   reflecting said pulsed beam back to a receiver;
   measuring the time difference between the transmitted and received pulses;
   transmitting a second pulsed beam from a second position spaced apart from the first position to a second reflector, the second reflector spaced apart from the first reflector;
   reflecting said pulsed beam back to a receiver;
   measuring the time difference between the transmitted and received pulses;
   digitizing the time delays between the first set of transmitted and received pulses and between the second set of transmitted and received pulses;
   averaging the first and second sets of digitized numbers to produce an averaged number corresponding to said first and second sets of digitized numbers, respectively, representative of the position of the ship with reference to points intermediate of the reflectors and intermediate of the first and second positions; and
   displaying this number to reflect the relative position of the vessel to the dock.

7. The method of claim 6 which includes:
   measuring an angle between the first position and the first reflector and measuring an angle between the second position and the second reflector;
   computing the range between the vessel and the dock in reference to the first and second positions;
   computing the velocity of the vessel as it approaches the dock between the vessel and the dock in reference to the first and second positions;
   averaging the range components to provide an intermediate range;
   averaging the velocity components to provide an intermediate velocity;
   displaying an average range of the vessel with reference to the dock as $x$ and $y$ coordinates of the range; and
   displaying the average velocity of the vessel as $x$ and $y$ coordinates of velocity.

8. The method of claim 7 which includes determining the attitude of the ship's position by determining the difference between the y coordinates of the first and second optical assemblies and displaying said difference.

9. The method of claim 6 which includes:
   adding said average numbers to a register as stored numbers, said register containing a plurality of previously stored numbers;
   subtracting a stored number previously stored in said register;

averaging the stored numbers in said register; and
displaying said numbers in digital form.

* * * * *